United States Patent
Prochnau et al.

(10) Patent No.: US 10,670,777 B2
(45) Date of Patent: Jun. 2, 2020

(54) OPTICAL COMPONENT AND METHOD FOR COATING OPTICAL COMPONENT

(71) Applicant: tooz technologies GmbH, Aalen (DE)

(72) Inventors: Jens Prochnau, Oberkochen (DE); Joerg Puetz, Aalen (DE)

(73) Assignee: tooz technologies GmbH, Aalen (DE)

(\*) Notice: Subject to any disclaimer, the term of this patent is extended or adjusted under 35 U.S.C. 154(b) by 76 days.

(21) Appl. No.: 15/762,553

(22) PCT Filed: Sep. 15, 2016

(86) PCT No.: PCT/EP2016/071796
§ 371 (c)(1),
(2) Date: Mar. 22, 2018

(87) PCT Pub. No.: WO2017/050627
PCT Pub. Date: Mar. 30, 2017

(65) Prior Publication Data
US 2019/0079215 A1    Mar. 14, 2019

(30) Foreign Application Priority Data
Sep. 23, 2015  (DE) .................... 10 2015 116 121

(51) Int. Cl.
*G02B 1/11* (2015.01)
*G02B 1/14* (2015.01)
(Continued)

(52) U.S. Cl.
CPC .......... *G02B 1/14* (2015.01); *B29D 11/00875* (2013.01); *G02B 1/11* (2013.01); *G02B 27/0172* (2013.01)

(58) Field of Classification Search
CPC ........ G02B 27/0172; G02B 1/11; G02B 1/14; G02B 1/105
(Continued)

(56) References Cited

U.S. PATENT DOCUMENTS

| 5,800,907 A | * | 9/1998 | Yumoto ................. B29C 41/12 |
| | | | 428/195.1 |
| 2003/0175528 A1 | | 9/2003 | Yoshitake et al. |
| 2013/0050851 A1 | | 2/2013 | Machida |

FOREIGN PATENT DOCUMENTS

| EP | 2177942 A1 | 4/2010 |
| WO | 2006084531 A1 | 8/2006 |

OTHER PUBLICATIONS

The International Search Report and Written Opinion rendered by the International Searching Authority for PCT/EP2016/071796, dated Dec. 14, 2016, 11 pages.
(Continued)

*Primary Examiner* — Hung X Dang
(74) *Attorney, Agent, or Firm* — Skaar Ulbrich Macari, P.A.

(57) ABSTRACT

Methods for coating an optical component with a sharp-edged structure and an optical component are provided. In a variant of the method, the sharp-edged structure in the optical component is rounded in that a lacquer that forms a lacquer meniscus is applied to the sharp-edged structure and subsequently solidified, the lacquer meniscus forming the rounding after the lacquer has solidified. After the rounding, a coating is applied to the optical component, the coating being applied at least to the lacquer meniscus.

20 Claims, 3 Drawing Sheets

(51) Int. Cl.
*B29D 11/00* (2006.01)
*G02B 27/01* (2006.01)

(58) Field of Classification Search
USPC .......................................... 359/743; 264/1.7
See application file for complete search history.

(56) References Cited

OTHER PUBLICATIONS

International Preliminary Report on Patentability rendered by the International Bureau of WIPO for PCT/EP2016/071796, dated Mar. 27, 2018, 7 pages.

* cited by examiner

OPTICAL COMPONENT AND METHOD FOR COATING OPTICAL COMPONENT

PRIORITY

This application claims the benefit of German Patent Application No. 102015116121.4, filed on Sep. 23, 2015, which is hereby incorporated herein by reference in its entirety.

FIELD

The present invention relates to a method for coating an optical component that has one or more sharp-edged structures. The invention also relates to a coated optical component with a sharp-edged structure.

BACKGROUND

It may be necessary to provide optical components with sharp-edged structures for application or production reasons. For example, it may be of advantage to introduce stray light edges into an optical component in order to prevent unwanted stray light or extraneous light in light-guiding regions of the component. Such stray light edges and corners must under some circumstances be formed with sharp edges because of their function, i.e. they must not have any or only a very slight rounding—that is to say only a very small radius of curvature. Sharp edges may additionally also occur for process-related reasons, for example during injection molding. The sharp edges may in this case either be formed concavely (included angle of the areas bordering the edge of less than 180°) or convexly (included angle of the areas bordering the edge of greater than 180°).

Furthermore, optical components often have to be provided with functional layers by means of coating processes. Primer layers, which serve for example for promoting adhesion, and hard layers, for increasing the mechanical resistance of the surface of the component, may be mentioned here by way of example. In the region of a concave sharp edge or corner, the application of coatings in wet coating processes may be problematic, since an accumulation of coating material may occur in the region of the edge or corner because of the surface tension. Since, as a result, the coating thickness at this point is much greater than on the adjacent areas, in the case of many of the coatings that are typically used this can lead to the formation of cracks or even to the coating peeling off or coming away (delamination) because of a buildup of stress. The often used polysiloxane-based hard layers are susceptible to this in particular. But purely polymer-based lacquers, such as those used as primer layers, may also display similar phenomena if the thickness of the layer is too great. In addition, with a convex sharp edge or corner there may be a thinning of the coating material at the edges, that is to say a flowing away from the edge or corner, which in turn has the result that the thickness of the layer may be too little in the region of this edge.

This is not only critical with regard to the durability of the layers, but may also lead to contaminants or the like in subsequent processes, and in addition to impairments and optical defects, for example due to inhomogeneous and/or incomplete drying. With an inhomogeneous layer thickness, it may be that the primer or hard lacquer for example would influence the optical properties of the stray light edge or the adjacent areas (for example by forming a meniscus of the primer layer or hard layer, etc.). On the other hand, it is often of great advantage for the application of the hard lacquer if the complete component can be coated.

SUMMARY

An object of the present disclosure is to provide a coating method for the coating of an optical component with a sharp-edged structure with which coatings, such as for example primer layers and/or hard layers or other functional layers with for example photochromic or reflection-reducing properties, can be applied without the problems described above. In addition, an object of the present disclosure is to provide an advantageous optical component with a sharp-edged structure.

The disclosure includes a method for coating an optical component as well as an optical component.

In the method for coating an optical component with a sharp-edged structure, the sharp-edged structure is rounded with the aid of a flowable film. All structures that have a sharp edge or a pointed corner are to be regarded here as a sharp-edged structure; the edges are to be regarded as sharp-edged and the corners as pointed if they have a radius of curvature of zero or virtually zero. In particular, edges or corners of which the radius of curvature is less than 1 mm, more particularly less than 0.1 mm, are to be regarded as sharp or pointed. Furthermore, in the case of a sharp edge or a pointed corner, the areas adjacent to the edge or corner may in particular include an angle in the range from 0° to 45° (concave sharp edge or corner) or an angle from 315° to 360° (convex sharp edge or corner).

The rounding of the sharp-edged structure is performed by a flowable film that forms a film meniscus being applied to the sharp-edged structure and subsequently solidified, the film meniscus forming the rounding after the flowable film has solidified. In the case of a concave edge or corner, the material of the film is chosen such that the film forms a concave meniscus, and in the case of a convex edge or corner such that the film forms a convex meniscus. The solidifying of the flowable film itself may be performed by drying the film, that is to say by evaporation of liquid film constituents, and/or by curing the film, that is to say by crosslinking of polymer constituents of the film. If both drying and curing are performed, the drying and the curing may take place simultaneously, or drying may be performed first and then curing. The curing may also be initiated by an external effect. External effects here may be temperature effects, for example in that the optical component provided with the film is heated in an oven, effects by means of electromagnetic radiation, for example in that the component provided with the film is exposed to ultraviolet light, etc. A lacquer may be used for example as the flowable film, a lacquer which has a low shrinkage and/or a high flexibility at least during the formation of the film and the solidification. In particular, the lacquer may be a reactive lacquer with or without solvent, that is to say a one- or two-component lacquer, which already cures at room temperature by chemical reaction. In the case of a reactive lacquer with solvent, it is first dried and then the dried film is reactively cured (for example with UV radiation). In the case of a solvent-free lacquer, immediate curing of the wet film takes place. Instead of a lacquer, however, some other viscous compound, for example a resin or a dispersion, may also be used as the flowable film.

After the rounding, a coating is applied to the optical component, the coating being applied at least to the film meniscus.

The rounded surface has a considerably greater radius of curvature in comparison with the sharp-edged structure. Therefore, a coating with a more uniform thickness in comparison with the prior art can be applied, so that an accumulation of coating material or a flowing away of coating material does not occur in the region of the sharp-edged structure (edge or corner), and therefore the problems described at the beginning of crack formation, the layer peeling off or coming away, formation of inhomogeneities, etc., are avoided or at least greatly reduced.

There is a greater selection of possible materials for the flowable film to be used for the rounding than for example for the primer layers and in particular than for the hard layers. When rounding the sharp-edged structure with a flowable film, such as for instance a lacquer, the problems of crack formation, the layer peeling off or coming away, formation of inhomogeneities, etc. can therefore be avoided by using a film material that has a sufficiently high flexibility during solidification that no cracks form or layers peel off or come away even when there are great differences in thickness in the film layer. Films in the form of lacquers with a high solids content, i.e. a solids content of over 50% by weight, in particular over 70% by weight, are suitable here in particular, since the shrinkage of the film can be kept low as a result. When selecting a suitable film, the viscosity and the surface tension of the film in the liquid state and also the brittleness of the solidified film may additionally also be taken into consideration.

An optical absorption lacquer, which completely absorbs incident light, for example by having a high content of carbon black and an adapted refractive index, may be applied in particular as the lacquer. This variant is appropriate in particular when the sharp-edged structure is formed for example as a stray light edge, which as a screen-like structure is intended to prevent the penetration of unwanted stray light into light-guiding regions of the optical component and eliminate stray light from the internal beam path.

A polymer-based lacquer may also be used in particular as the lacquer. Such lacquers can be provided with high flexibility in comparison with other lacquers. Furthermore, polymer-based lacquers are available in various compositions, so that a suitable lacquer can be selected for a large number of substrate or coating materials. For example, a suitable polymer-based lacquer may be selected with a view to best possible conditions for the lacquer to adhere to the substrate, that is to say the optical component, or for the coating to adhere to the lacquer. In another example, the polymer-based lacquer may be selected with a view to the optical properties of the material of the optical component or of the coating material.

The coating to be applied may comprise at least one functional layer, such as for example a hard layer and/or an antireflection layer. Furthermore, it may comprise a primer layer, that is to say a priming or adhesion promoter layer, which improves the adhesion of the following functional layer on the film. As such, the primer layer has good adhering properties both with respect to the film used and with respect to the following functional layer. The functional layer may however also be applied directly to the film, as long as it offers sufficient adhering properties for the functional layer.

An optical component according to the disclosure with a sharp-edged structure has a film which is applied over the sharp-edged structure and has in the region of the sharp-edged structure a film meniscus formed over the sharp-edged structure. At least on the film meniscus there is a coating. This coating may comprise a functional layer, such as for example a hard layer and/or an antireflection layer. Moreover, there may be a primer layer under the functional layer. Here, the sharp-edged structure in the component according to the invention may be for example a stray light edge. A spectacle lens for smart glasses or an input coupling device for coupling an imaging beam path into the spectacle lens of smart glasses comes into consideration for example as the optical component with a sharp-edged structure.

The component is advantageous to the extent that the coating can be applied to the optical component with a uniform thickness because of the meniscus that is formed in the film over the sharp-edged structure—and consequently because of the increased radius of curvature in comparison with the sharp-edged structure. As a result, cracks, instances of delamination and peeling off of the coating, inhomogeneities in the coating, etc., can be reliably avoided. In particular, the coating can have a uniform thickness everywhere it is present on the component.

If the sharp-edged structure in the optical component is a stray light edge, the film may be in particular an optical absorption lacquer. In addition, it is advantageous if the film is a polymer-based lacquer, as already explained further above.

Further features, properties and advantages of the present invention will become apparent from the following description of exemplary embodiments with reference to the accompanying figures.

Figure 1:
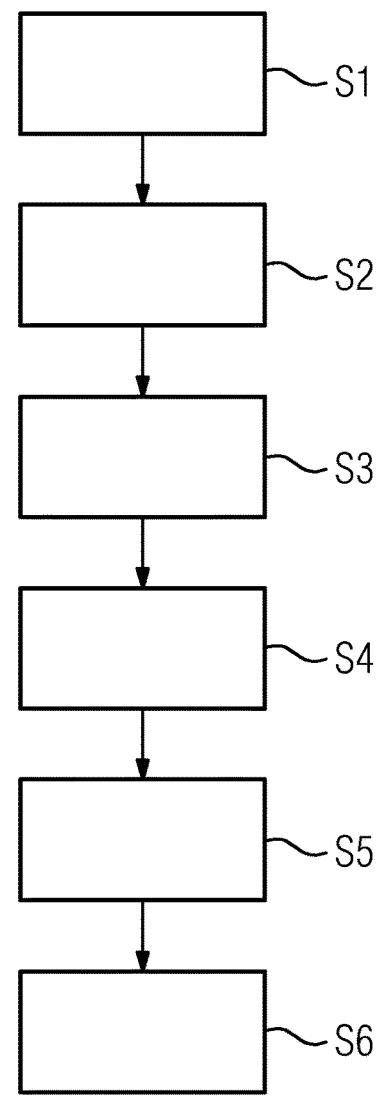
FIG. 1 shows an exemplary embodiment of a method according to the invention for coating an optical component in the form of a flow diagram.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

An exemplary embodiment of the method according to the invention for coating an optical component is described below with reference to the accompanying figures. FIG. 1 in this case describes the sequence of the method on the basis of a flow diagram, FIGS. 2 to 5 describe an optical component according to the invention during various stages of the coating method.

Figure 2:
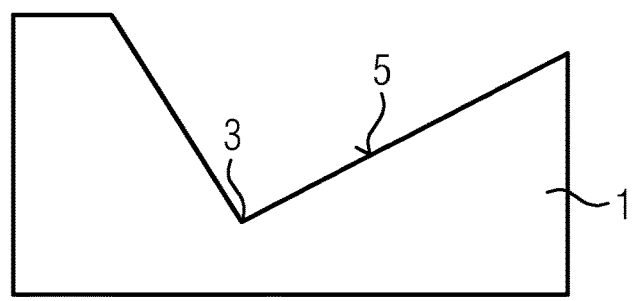
FIGS. 2 to 5 show an optical component according to the invention in various stages of its production process.

At the beginning of the method for coating an optical component, in step S1 an optical component 1 with a sharp edge 3 in its surface 5 is provided. A sharp edge is to be understood here as meaning an edge that has substantially no rounding in the edge region. The edge may be regarded as having no rounding if the radius of curvature of a rounding is <1 mm, in particular <0.1 mm. Furthermore, in the case of a sharp edge, the areas adjacent to the edge may in particular include an angle in the range from 0° to 45° (concave sharp edge) or an angle from 315° to 360° (convex sharp edge). Such sharp edges may be used for example as stray light edges in optical components or occur for production reasons. A schematic representation of an optical component 1 with the sharp edge 3 as it is provided in step S1 of the method is shown in FIG. 2. In this optical component, the sharp edge is a concave edge.

Figure 6:
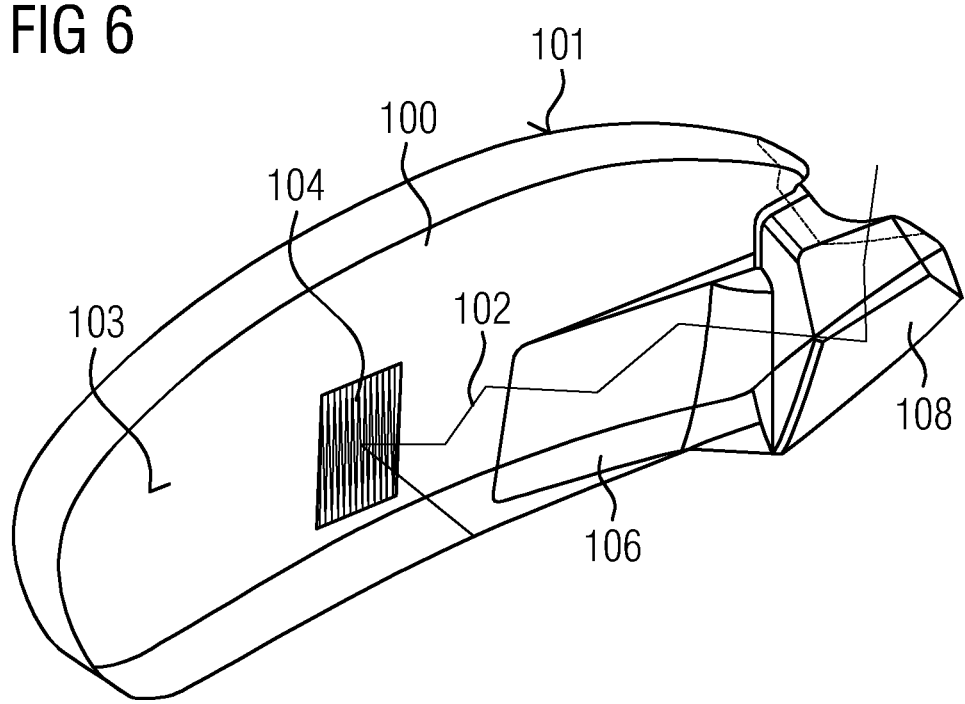
FIG. 6 shows a spectacle lens for smart glasses together with a prism for coupling an imaging beam path into the spectacle lens.

Optical components in which stray light edges are used are used for example in the area of smart glasses. Smart glasses generally comprise, inter alia, a spectacle lens, through which an imaging beam path originating from a display device is guided under multiple reflection at the spectacle lens surfaces to an output coupling structure, from which it is output coupled from the spectacle lens in the direction of the eye of a user. An example of such a spectacle lens 100 is represented in FIG. 6. As shown in FIG. 6, the spectacle lens 100 may have an edge thickening region 106, in which the thickness of the spectacle lens 100 is increased in order to achieve optimum guidance of the imaging beam path to the output coupling structure 104. The imaging beam path 102 is coupled into the spectacle lens 100 with the aid of a prism 108, which serves as an input coupling device. By means of the prism 108, which is occasionally also referred to as a tube, the imaging beam path 102 coming from the display (not shown) is coupled into the spectacle lens 100 at such an angle that it can reach the output coupling structure 104 under multiple reflection at the outer surface 101 and at the inner surface 103 of the spectacle lens 100. Here there may be a stray light edge in the spectacle lens 100 or in the prism 108. This stray light edge serves the purpose of preventing stray light from reaching the output coupling structure 104, from where it would be output coupled in the direction of the eye of the user. The output-coupled stray light would then lead to undesired effects in the image perceived by the user.

In step S2, application of a flowable film 7 to the surface 5 of the optical component 1 is performed. In the present exemplary embodiment, a lacquer 7 is applied as the flowable film. The lacquer 7 is at least applied in that region of the surface 5 in which the concave sharp edge 3 is located. There it forms a concave lacquer meniscus 8 with a great radius of curvature in comparison with the radius of curvature of the sharp edge 3. The optical component 1 with the applied lacquer 7 is represented in FIG. 3.

Figure 3:
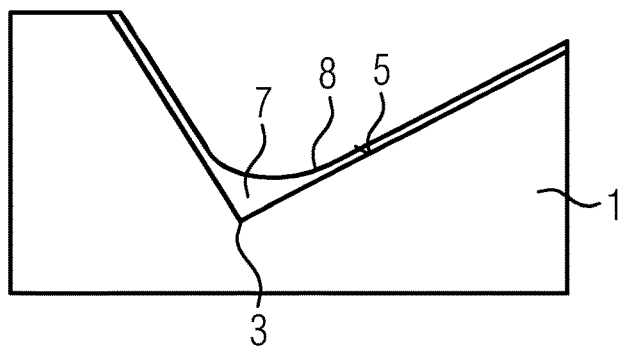

A lacquer that does not crack during drying and/or curing, even if the lacquer layer 7 has regions with different thicknesses, as is the case in FIG. 3, is used as the lacquer in the method according to the invention. It can be seen in FIG. 3 that the thickness of the lacquer layer 7 in the region of the sharp edge 3 is much greater than in the adjacent regions of the surface 5 due to the formation of the meniscus 8. Cracks in the lacquer can be avoided by the lacquer used having the least possible shrinkage and/or a high flexibility, which in turn can be achieved in particular by the lacquer having a high solids content. A high solids content can be assumed here if the proportion by weight of the solids is at least 50% by weight, in particular at least 70% by weight. If a reactive lacquer (with or without solvent) is used as the lacquer, solids contents up to almost 100% by weight (more than 90% by weight) are possible. The thickness of the lacquer 7 and the radius of curvature of the lacquer meniscus 8 in the region of the sharp edge 3 are influenced, inter alia, by the viscosity of the liquid lacquer, the surface tension of the liquid lacquer and the interfacial tension between the liquid lacquer and the material of which the optical component consists. Therefore, the following parameters of the lacquer are of importance in particular for the selection of a suitable lacquer: solids content, viscosity and surface tension. Then there is in addition, as a further parameter that is of importance for the selection, the interfacial tension between the liquid lacquer and the material of which the optical component consists. If the sharp-edged structure 3 for example forms a stray light edge, an absorption lacquer that absorbs stray light may be used in particular as the lacquer 7.

In the step following the application of the lacquer 7, step S3, drying of the lacquer 7 is brought about. This may be performed for example by the optical component 1 that is provided with the liquid lacquer being left at room temperature until the lacquer has dried through. Alternatively, drying may also take place at elevated temperatures, in order to speed up the drying, for example in that the optical component provided with the liquid lacquer is heated in an oven. During the drying of the lacquer, the liquid lacquer constituents evaporate, the solid particles moving toward one another as a result of the capillary effect that occurs during the evaporation of the amount of liquid in the lacquer. The accompanying reduction in the volume of the lacquer may lead to an increase in stress, and as a result to cracks, if the solids content in the lacquer is too low. Furthermore, drying that is too quick may likewise lead to cracks. Therefore, in the present method the drying takes place slowly enough that the solid particles have enough time during the drying to rearrange themselves without cracks forming.

Once the lacquer has been dried in step S3, a curing of the lacquer is performed in an optional step S4, crosslinking of polymer constituents of the lacquer taking place. If this optional step S4 is performed, a curable lacquer, for example a polymer-based lacquer, is therefore used as the lacquer 7. The curing of the lacquer may be brought about by supplying energy from outside, for example by heat or ultraviolet radiation. For this purpose, the lacquered optical component 1 may be introduced into an oven, or be irradiated with UV light. However, it should be pointed out at this stage that the drying and curing do not necessarily need to be performed one after the other. Depending on the lacquer used, the curing may also be performed simultaneously with the drying, in particular whenever the drying takes place at elevated temperature. Furthermore, there are also polymer-based lacquers that cure in air, so that it is not necessary for energy to be introduced into the lacquer.

Figure 4:
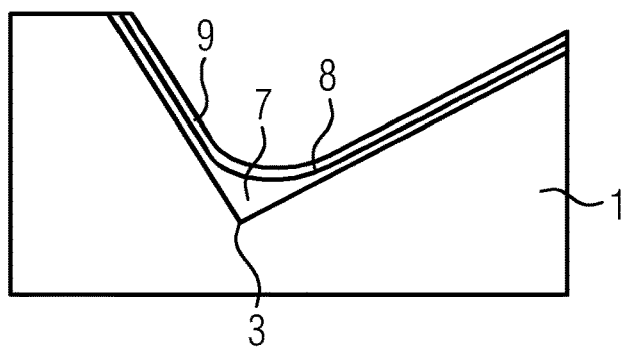

In the step following the drying and optional curing, step S5, a primer layer 9 is applied to the lacquer 7 in the present exemplary embodiment as the first layer of a coating. As a result of the meniscus 8 formed in the lacquer 7 over the sharp edge 3, in the region of the sharp edge 3 there is a great radius of curvature for the primer layer 9, which has the effect that the primer layer 9 can be applied to the entire lacquer layer 7 with a largely uniform thickness. Since there are no differences in thickness in the primer layer 9, the risk of crack formation when the primer layer 9 solidifies is greatly reduced. Therefore, the material of the primer layer 9 has to meet considerably lower requirements with regard to the avoidance of cracks during the solidifying of the layer than have to be met by the lacquer 7. Therefore, customary primer layers, which would tend toward the formation of cracks if in the layer there were regions with different layer thicknesses, can be used. The optical component 1 with the primer layer 9 applied to the lacquer layer 7 is represented in FIG. 4.

Figure 5:
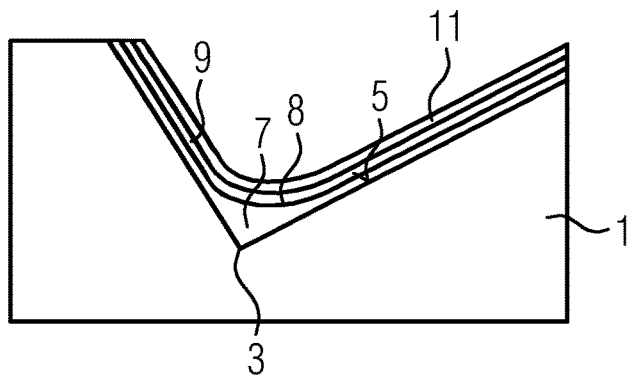

In the last step of the method according to the invention, step S6, in the present exemplary embodiment a hard layer 11 is applied to the primer layer 9. Here, too, it is again the case that the hard layer 11 can be applied with a uniform thickness as a result of the meniscus 8 a great radius of curvature present in the region of the sharp edge 3, so that crack formation can be reliably avoided even whenever the coating material used would tend toward cracks in the case of regions with different layer thicknesses. The finished coated optical component 1 is represented in FIG. 5.

With the aid of the method according to the invention, it is possible to apply the previously used primer and hard layers in the case of a component with a sharp edge even in the region of the sharp edge without these layers forming cracks when they solidify. Decisive for this is that, at least in the region of the sharp edge 3, there is applied under the coating a film 7 that forms a meniscus 8 in the region of the sharp edge 3, and thus increases the radius of curvature in the region of the sharp edge 3, so that the actual coating can be performed with layers of uniform thickness.

The present invention has been described in detail on the basis of a specific exemplary embodiment for purposes of explanation. It goes without saying that the exemplary embodiment does not cover all possible variants of the invention, but that it can also comprise departures from the exemplary embodiment. Thus, in the present exemplary embodiment, the coating includes a primer layer as an adhesion promoter layer and a hard layer applied thereover. The coating may however also be made up differently. For example, it may also have in addition to the hard layer or as an alternative to the hard layer an antireflection layer (AR layer). In addition, it is also possible to dispense with the primer layer, if the adhesion properties of the hard layer or of the AR layer on the lacquer so allow. Moreover, instead of a lacquer, a resin or a dispersion may also be applied as the flowable film. Further possible departures from the specific exemplary embodiment have already been described when describing the individual method steps. The extent of the invention should therefore not just be confined to the exemplary embodiment described, but should only be restricted by the appended claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

LIST OF REFERENCE SIGNS

1 Optical component
3 Sharp edge
5 Surface
7 Lacquer
8 Lacquer meniscus
9 Primer layer
11 Hard layer
100 Spectacle lens
101 Outer surface
102 Imaging beam path
103 Inner surface
104 Output coupling structure
106 Thickening region
108 Prism
S1 Providing an optical component with a sharp edge
S2 Applying a lacquer
S3 Drying the lacquer
S4 Curing the lacquer
S5 Applying a primer layer
S6 Applying a hard layer

The invention claimed is:

1. A method for coating an optical component with a sharp-edged structure, the method comprising:
   rounding the sharp-edged structure by applying a flowable film to form a film meniscus and subsequently solidifying the film meniscus formed by the flowable film, wherein the solidifying of the flowable film comprises curing of the flowable film such that there is a crosslinking of polymer constituents of the flowable film; and
   after the rounding, applying a coating to the optical component, the coating being applied at least to the film meniscus.

2. The method of claim 1, wherein the solidifying of the flowable film further comprises drying of the flowable film.

3. The method of claim 1, wherein the flowable film is formed by a lacquer which has at lest one of a low shrinkage and a high flexibility during the formation of the film and the solidification.

4. The method of claim 3, wherein an optical absorption lacquer is applied as the lacquer.

5. The method of claim 4, wherein a polymer-based lacquer is used as the lacquer.

6. The method of claim 1, wherein the flowable film has an average to high solids content.

7. The method of claim 1, wherein the coating comprises at least one functional layer.

8. The method of claim 7, wherein the coating comprises a primer layer, the primer layer being applied to the optical component at least in the region of the film meniscus and the at least one functional layer being applied to the primer layer.

9. The method of claim 7, wherein the coating comprises at least one of a hard layer and an antireflection layer as the at least one functional layer.

10. An optical component, comprising:
    a sharp-edged structure;
    a cured film, having crosslinked polymer constituents thereof, applied over the sharp-edged structure with a film meniscus in a region of the sharp-edged structure; and
    a coating disposed at least on the film meniscus.

11. The optical component of claim 10, wherein the coating has a uniform thickness everywhere it is present on the component.

12. The optical component of claim 10, wherein the flowable film is a lacquer.

13. The optical component of claim 12, wherein the lacquer is an optical absorption lacquer.

14. The optical component of claim 12, wherein the lacquer is a polymer-based lacquer.

15. The optical component of claim 10, wherein the coating comprises at least one functional layer.

16. The optical component of claim 15, wherein there is a primer layer under the at least one functional layer.

17. The optical component of claim 15, wherein the at least one functional layer comprises at least one of a hard layer and an antireflection layer.

18. The optical component of claim 10, wherein the sharp-edged structure is a stray light edge.

19. The optical component of claim 10, wherein the optical component is formed as a spectacle lens.

20. The optical component of claim 10, wherein the optical component is formed as an input coupling device for smart glasses.

\* \* \* \* \*